United States Patent [19]
Tsuchiya et al.

[11] Patent Number: 5,978,844
[45] Date of Patent: Nov. 2, 1999

[54] INTERNETWORKING APPARATUS FOR LOAD BALANCING PLURAL NETWORKS

[75] Inventors: Kazuaki Tsuchiya, Yokohama; Yoshihito Sako, Hadano; Tetsuo Oura, Yokohama; Ken Watanabe, Fujisawa, all of Japan

[73] Assignee: Hitachi, Ltd., Tokyo, Japan

[21] Appl. No.: 08/708,927

[22] Filed: Sep. 6, 1996

[30] Foreign Application Priority Data

Sep. 8, 1995 [JP] Japan .................................. 7-231479

[51] Int. Cl.[6] .................................................. G06F 13/00
[52] U.S. Cl. ............................................................ 709/221
[58] Field of Search ........................ 395/200.56, 200.31, 395/200.33, 200.53, 200.59, 200.64, 200.65, 200.69; 709/200, 201, 220, 221, 223, 224, 226; 370/254, 255, 231, 235, 252, 253

[56] References Cited

U.S. PATENT DOCUMENTS

| | | | |
|---|---|---|---|
| 4,621,359 | 11/1986 | McMillen | 370/235 |
| 5,031,089 | 7/1991 | Liu et al. | 395/200.56 |
| 5,239,653 | 8/1993 | Cubero-Castan et al. | 370/231 |
| 5,283,897 | 2/1994 | Georgiadis et al. | 395/675 |
| 5,434,863 | 7/1995 | Onishi et al. | 370/402 |
| 5,539,883 | 7/1996 | Allon et al. | 370/237 |
| 5,592,672 | 1/1997 | Grewal et al. | 709/238 |
| 5,655,120 | 8/1997 | Witte et al. | 709/223 |
| 5,675,791 | 10/1997 | Bhide et al. | 707/205 |
| 5,701,482 | 12/1997 | Harrison et al. | 709/100 |
| 5,774,668 | 6/1998 | Choquier et al. | 370/480 |

*Primary Examiner*—Moustafa M. Meky
*Attorney, Agent, or Firm*—Antonelli, Terry, Stout & Kraus, LLP

[57] ABSTRACT

An internetworking apparatus for interconnecting a plurality of networks, having forwarding sections corresponding to interfaces of the networks, each including a processor for performing packet forwarding processing and a statistics unit for collecting processing time statistics of the processor. An adjusting section connected to all the forwarding sections through a bus instructs each processor to change a program to be executed thereby based on the processing time statistics reported by each processor so as to balance processing loads on the respective processors.

15 Claims, 15 Drawing Sheets

FIG.10

ROUTING TABLE ~44~47

| DESTINATION IP ADDRESS | NEXT NODE IP ADDRESS | FORWARDING SECTION |
|---|---|---|
| IP ADDRESS a | IP ADDRESS a | FORWARDING SECTION a |
| IP ADDRESS b | IP ADDRESS b | FORWARDING SECTION b |
| IP ADDRESS c | IP ADDRESS c | FORWARDING SECTION c |
| ⋮ | ⋮ | ⋮ |
| IP ADDRESS z | IP ADDRESS z | FORWARDING SECTION z |

FIG.11

ARP TABLE ~48~51

| NEXT NODE IP ADDRESS | NEXT NODE MAC ADDRESS | MAXIMUM PACKET LENGTH |
|---|---|---|
| IP ADDRESS a | MAC ADDRESS a | A |
| IP ADDRESS b | MAC ADDRESS b | B |
| IP ADDRESS c | MAC ADDRESS c | C |
| ⋮ | ⋮ | ⋮ |
| IP ADDRESS z | MAC ADDRESS z | Z |

FIG. 12

STATISTICS OF INPUT SIDE PROCESSING TIMES u(i,j,k) OF PROCESSOR i

| | | | DESTINATION | | | | TOTAL |
|---|---|---|---|---|---|---|---|
| | | | FORWARDING SECTION 21 | FORWARDING SECTION 22 | FORWARDING SECTION 23 | FORWARDING SECTION 24 | |
| | | | j=1 | j=2 | j=3 | j=4 | |
| STEP 101 | k=1 | | u(i,1,1) | u(i,2,1) | u(i,3,1) | u(i,4,1) | $\sum_{j=1}^{4} u(i,j,1)$ |
| STEP 102 | k=2 | | u(i,1,2) | u(i,2,2) | u(i,3,2) | u(i,4,2) | $\sum_{j=1}^{4} u(i,j,2)$ |
| STEP 103 | k=3 | | u(i,1,3) | u(i,2,3) | u(i,3,3) | u(i,4,3) | $\sum_{j=1}^{4} u(i,j,3)$ |
| STEP 104 | k=4 | | u(i,1,4) | u(i,2,4) | u(i,3,4) | u(i,4,4) | $\sum_{j=1}^{4} u(i,j,4)$ |
| STEP 105 | k=5 | STEP | u(i,1,5) | u(i,2,5) | u(i,3,5) | u(i,4,5) | $\sum_{j=1}^{4} u(i,j,5)$ |
| STEP 106 | k=6 | | u(i,1,6) | u(i,2,6) | u(i,3,6) | u(i,4,6) | $\sum_{j=1}^{4} u(i,j,6)$ |
| STEP 107 | k=7 | | u(i,1,7) | u(i,2,7) | u(i,3,7) | u(i,4,7) | $\sum_{j=1}^{4} u(i,j,7)$ |
| STEP 111 | k=8 | | u(i,1,8) | u(i,2,8) | u(i,3,8) | u(i,4,8) | $\sum_{j=1}^{4} u(i,j,8)$ |
| STEP 112 | k=9 | | u(i,1,9) | u(i,2,9) | u(i,3,9) | u(i,4,9) | $\sum_{j=1}^{4} u(i,j,9)$ |
| TOTAL | | | $\sum_{k=1}^{9} u(i,1,k)$ | $\sum_{k=1}^{9} u(i,2,k)$ | $\sum_{k=1}^{9} u(i,3,k)$ | $\sum_{k=1}^{9} u(i,4,k)$ | $\sum_{j=1}^{4}\sum_{k=1}^{9} u(i,j,k)$ |

STATISTICS OF OUTPUT SIDE PROCESSING
TIMES d(i,j,k) OF PROCESSOR i

| STEP | | ORIGINATION | | | | TOTAL |
|---|---|---|---|---|---|---|
| | | FORWARDING SECTION 21 $j=1$ | FORWARDING SECTION 22 $j=2$ | FORWARDING SECTION 23 $j=3$ | FORWARDING SECTION 24 $j=4$ | |
| STEP 101 | $k=1$ | d(i,1,1) | d(i,2,1) | d(i,3,1) | d(i,4,1) | $\sum_{j=1}^{4} d(i,j,1)$ |
| STEP 102 | $k=2$ | d(i,1,2) | d(i,2,2) | d(i,3,2) | d(i,4,2) | $\sum_{j=1}^{4} d(i,j,2)$ |
| STEP 103 | $k=3$ | d(i,1,3) | d(i,2,3) | d(i,3,3) | d(i,4,3) | $\sum_{j=1}^{4} d(i,j,3)$ |
| STEP 104 | $k=4$ | d(i,1,4) | d(i,2,4) | d(i,3,4) | d(i,4,4) | $\sum_{j=1}^{4} d(i,j,4)$ |
| STEP 105 | $k=5$ | d(i,1,5) | d(i,2,5) | d(i,3,5) | d(i,4,5) | $\sum_{j=1}^{4} d(i,j,5)$ |
| STEP 106 | $k=6$ | d(i,1,6) | d(i,2,6) | d(i,3,6) | d(i,4,6) | $\sum_{j=1}^{4} d(i,j,6)$ |
| STEP 107 | $k=7$ | d(i,1,7) | d(i,2,7) | d(i,3,7) | d(i,4,7) | $\sum_{j=1}^{4} d(i,j,7)$ |
| STEP 111 | $k=8$ | d(i,1,8) | d(i,2,8) | d(i,3,8) | d(i,4,8) | $\sum_{j=1}^{4} d(i,j,8)$ |
| STEP 112 | $k=9$ | d(i,1,9) | d(i,2,9) | d(i,3,9) | d(i,4,9) | $\sum_{j=1}^{4} d(i,j,9)$ |
| TOTAL | | $\sum_{k=1}^{9} d(i,1,k)$ | $\sum_{k=1}^{9} d(i,2,k)$ | $\sum_{k=1}^{9} d(i,3,k)$ | $\sum_{k=1}^{9} d(i,4,k)$ | $\sum_{j=1}^{4}\sum_{k=1}^{9} d(i,j,k)$ |

FIG. 13 ns network system organized of a plurality of interconected networks, and more particularly to an internetworking apparatus for interconnecting a plurality of networks, which is generally referred to as a router, a bridge or a bridging router.

INTERNETWORKING APPARATUS FOR LOAD BALANCING PLURAL NETWORKS

BACKGROUND OF THE INVENTION

1. Field of the Invention

The present invention relates generally to a communications network system organized of a plurality of interconnected networks, and more particularly to an internetworking apparatus for interconnecting a plurality of networks, which is generally referred to as a router, a bridge or a bridging router.

2. Description of the Related Art

Conventionally, an internetworking apparatus or node for interconnecting a plurality of networks is configured such that processors for performing packet forwarding processing are disposed corresponding to interfaces of the respective networks and are coupled to each other through a bus. Techniques described in U.S. Pat. No. 5,434,863 may be taken as an example of such an internetworking node.

FIG. 2 schematically illustrates an example of a communications network system comprising a plurality of interconnected networks. In the illustrated system, seven CSMA/CD (Carrier Sense Multiple Access with Collision Detection) networks 5–11 are connected through three routers 12–14 which support Internet Protocol (IP) as a protocol for network layer. In the router 12 in the prior art example, when a packet is forwarded from a network 5 to a network 8, a processor in the router 12 disposed corresponding to an interface of the network 5 and a processor in the router 12 disposed corresponding to an interface of the network 8 respectively execute predetermined fixed amounts of assigned processing for forwarding the packet therebetween.

Further, in the illustrated prior art example, even when the forwarding of a packet from the network 5 to the network 8 and the forwarding of a packet from a network 6 to a network 7 are simultaneously carried out through the router 12 in the communications network system, a plurality of packets can be simultaneously forwarded by processors disposed corresponding to interfaces of the networks 5–8 in the router 12.

The above-mentioned prior art system, however, has the following problem.

For example, if packets to be forwarded from the networks 5–7 to the network 8 concentrate in the router 12 in the communications network system illustrated in FIG. 2, the processor disposed corresponding to the interface of the network 8 must process all packets transmitted thereto from the processors disposed corresponding to the interfaces of the networks 5–7, thereby resulting in unbalanced processing loads on the respective processors. Eventually, when the processor disposed corresponding to the interface of the network 8 is burdened with a processing load exceeding its processing capability, the packet forwarding capability of the entire system is determined by the processing capability of the processor disposed corresponding to the interface of the network 8. Since the respective processors forward packets by executing predetermined fixed amounts of their respective assigned processing even in such a case, processing load cannot be distributed among the respective processors to improve the processing capability as the entire system.

SUMMARY OF THE INVENTION

To solve the problem of the above-mentioned prior art, it is an object of the present invention to provide an internetworking apparatus having processors coupled to each other through a bus for performing packet forwarding processing disposed corresponding to interfaces of respective networks, wherein processing amounts on the input side and processing amounts on the output side assigned to the respective processors are modified to balance processing loads among the processors, such that the processing loads are uniformly distributed among the processors to improve the packet processing capability of the entire internetworking apparatus.

To achieve the above object, the present invention solves the problem by providing the following units in an internetworking apparatus, such as a router, having a plurality of forwarding sections disposed corresponding to interfaces of respective networks, coupled to each other through a bus, and processors disposed in the respective forwarding sections for performing the forwarding processing:

(1) statistics units associated with respective processors for collecting the statistics of processing time required to forward packets by the associated processor in a unit time such that the statistics of the input side processing are collected for each packet destination forwarding section and the statistics of the output side processing are collected for each packet originating forwarding section; and (2) an adjusting unit for changing allocation of the input side processing and the output side processing among the processors so as to balance processing loads on the respective processors based on the processing time statistics collected by the respective statistics units.

The operation of the present invention will be described below with reference to FIG. 1.

The processors 1–4, when performing the packet forwarding processing, notify the statistics units 52–55 of the start and the end of each processing.

The statistics units 52–55 recognize the start and the end of the respective packet forwarding processing by the notifications from the processors 1–4, collect the processing time statistics for packets forwarded by the processors 1–4 in a unit time such that the statistics of the input side processing are collected for each packet destination forwarding section 21–24 and the statistics of the output side processing are collected for each packet originating forwarding section 21–24.

The processors 1–4 operate transmitter units 26–29 to periodically transmit the processing time statistics of the respective processors 1–4 from the statistics units 52–55 to the adjusting unit 82.

The adjusting unit 82, when operating a transmitter unit 30 to recognize that the processing time statistics for the respective processors 1–4 have been transmitted thereto from the statistics units 52–55, changes allocation of the input side processing and the output side processing among the processors 1–4 so as to balance processing loads on the respective processors 1–4 based on the transmitted processing time statistics of the respective processors 1–4.

Alternatively, each processor may transmit the processing time statistics to a maintenance/management terminal 93 instead of the adjusting unit. In this case, a change in processing allocation may be determined by a manager and instructed to each processor from the maintenance/management terminal 93.

As a result, even if processing loads are not uniformly distributed within the processors 1–4, allocation of the input side processing and the output side processing is changed among the processors 1–4 to balance the processing loads on the respective processors 1–4, thereby making it possible to distribute the processing loads among the processors 1–4 to improve the packet processing capability as the entire internetworking apparatus.

BRIEF DESCRIPTION OF THE DRAWINGS

FIG. 10 illustrates the structure of a routing table;

FIG. 11 illustrates the structure of an ARP table;

FIG. 12 is a table showing processing time statistics of the input side processing;

FIG. 13 is a table showing processing time statistics of the output side processing;

DESCRIPTION OF THE PREFERRED EMBODIMENTS

One embodiment illustrating the present invention will hereinafter be described with reference to the accompanying drawings. It should be first noted that while an internetworking node of the present invention may be a router, a bridge, a bridging router, and so on, the following description will be made on a router which is a typical internetworking node.

Figure 1:
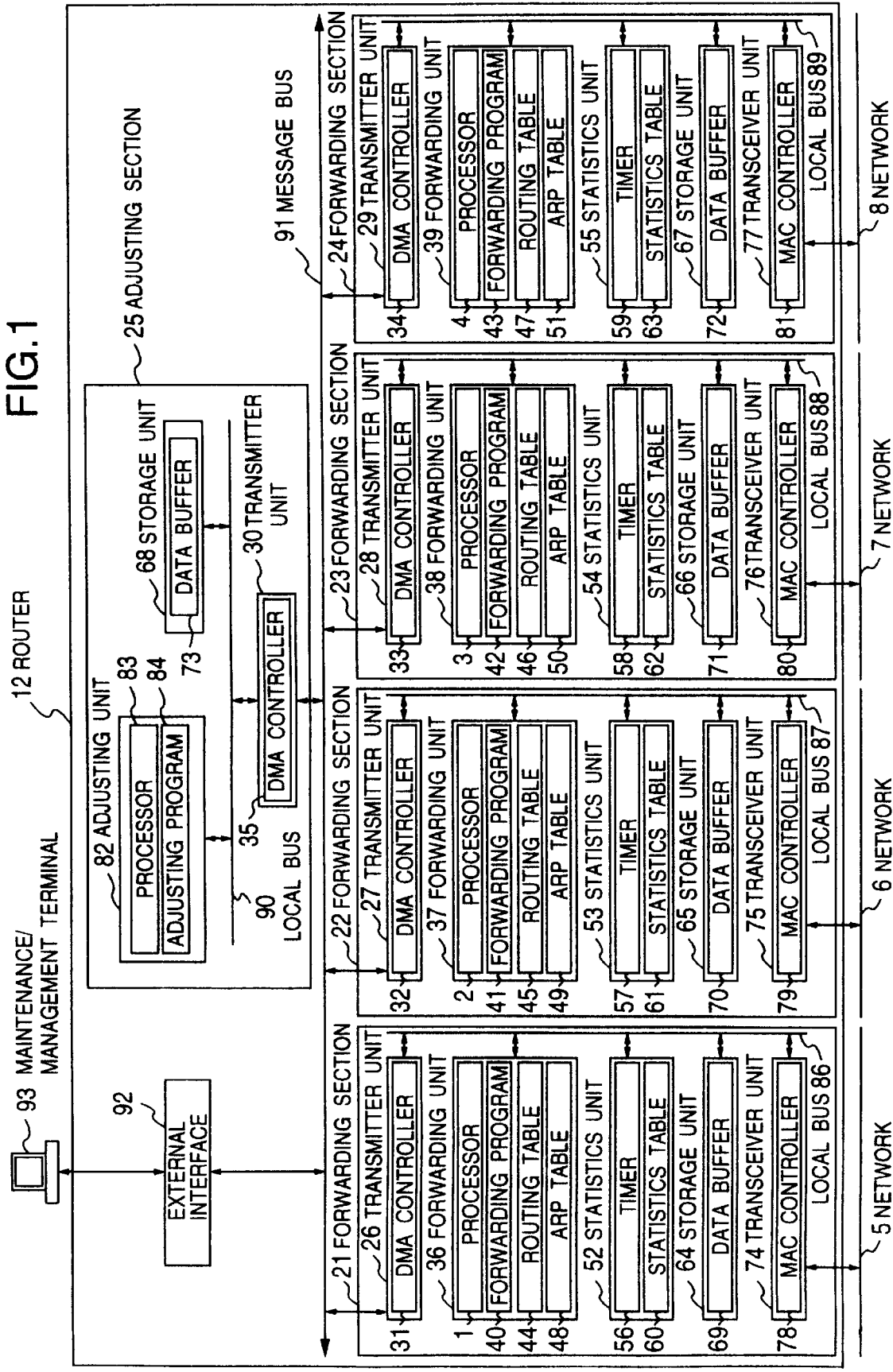
FIG. 1 is a block diagram illustrating an exemplary configuration of a router according to the present invention.
Figure 2:
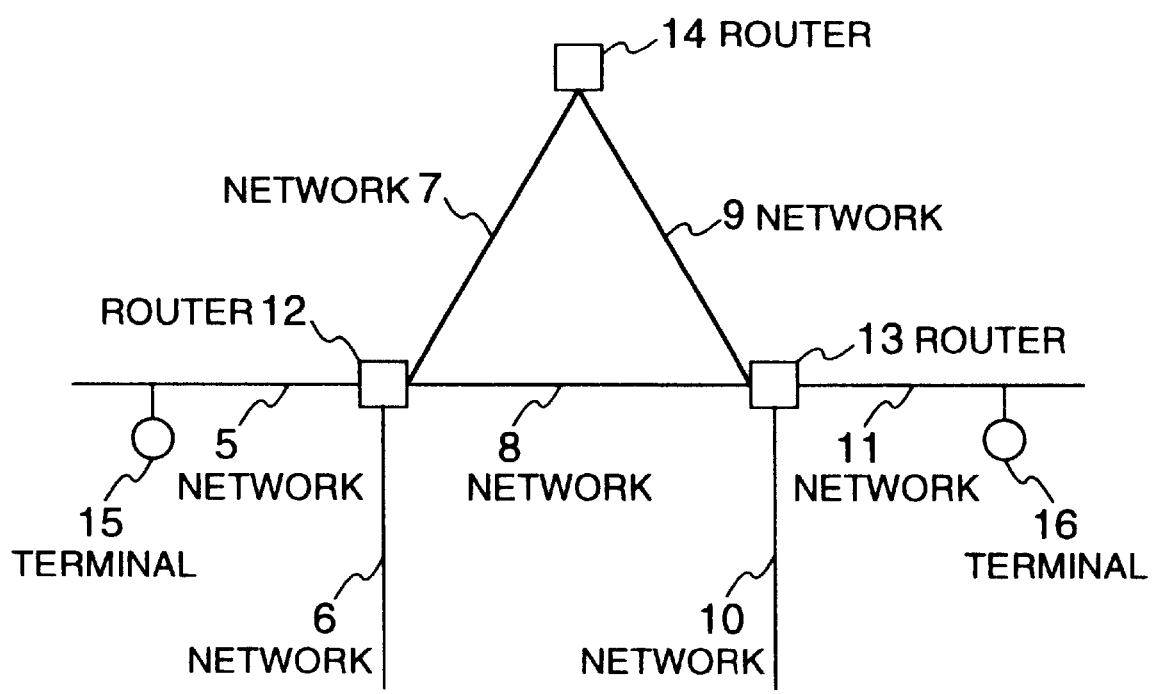
FIG. 2 is a schematic diagram illustrating a communications network system.

FIG. 1 illustrates an exemplary configuration of a router 12 according to the present invention. Assume that the router 12 is connected to a plurality of networks as illustrated in FIG. 2. The router 12 illustrated in FIG. 1 comprises forwarding sections 21–24 disposed corresponding to interfaces of respective networks 5–8; an adjusting section 25; and a message bus 91 interconnecting the forwarding section 21–24 and the adjusting section 25.

The forwarding sections 21–24 have transmitter units 26–29; forwarding units 36–39; statistics units 52–55; storage units 64–67; and transceiver units 74–77, respectively, and these components are connected through local buses 86–89 in the respective forwarding sections 21–24. The transmitter units 26–29, which control the transmission of messages (later described) between the associated forwarding sections and the adjusting section 25 via the message bus 91, comprise DMA (Direct Memory Access) controllers 31–34, respectively. The forwarding units 36–39, which mainly perform packet forwarding processing, are composed of processors 1–4, forwarding programs 40–43, routing tables 44–47, and ARP tables 48–51, respectively. The statistics units 52–55, which collect the statistics of processing time required to forward packets in a unit time in the processors 1–4, are composed of timers 56–59 and statistics tables 60–63, respectively. The storage units 64–67, which temporarily store packets or messages, comprises data buffers 69–72, respectively. The transceiver units 74–77, which control the transmission and reception of packets between the networks 5–8, comprise MAC controllers 78–81, respectively.

The adjusting section 25, in turn, is composed of a transmitter unit 30, a storage unit 68, and an adjusting unit 82 which are coupled to each other by a local bus 90. The transmitter unit 30, which controls the transmission of messages between the forwarding sections 21–24 and the adjusting section 25 via the message bus 91, comprises a DMA controller 35. The storage unit 68, which temporarily stores packets or messages, comprises a data buffer 73. The adjusting unit 82, composed of a processor 83 and an adjusting program 84, selects a program which balances processing loads on the respective processors 1–4 from programs for sharing different amounts of input side processing and output side processing, previously loaded in the forwarding programs 40–43, based on the processing time statistics of the respective processors 1–4 transmitted thereto from the forwarding sections 21–24, and instructs the respective processors 1–4 to execute the selected program.

Next, the operation of the above-mentioned internetworking node will be described in detail with reference to the accompanying drawings.

Described first is the packet forwarding processing from the network 5 to network 8 performed in the router 12 (FIG. 1) of the communications network system illustrated in FIG. 2.

A packet is transmitted from the forwarding section 21 connected to the network 5 to the forwarding section 24 connected to the network 8 through the message bus 91. During the transmission between the forwarding sections 21 and 24, the packet is treated in a form referred to as a message which is composed of the packet and a message header. The forwarding processing of the packet is shared by the processor 1 in the forwarding section 21 and the processor 4 in the forwarding section 24.

The processing performed on a packet, including reception of the packet from a network, addition of a message header to the packet and other associated processing, and transmission of the packet to the message bus 91 is collectively referred to as the "input side processing". The processing from the reception of a message from the message bus 91 to the transmission of the message to a network is referred to as the "output side processing". In this way, a packet inputted to the router 12 is necessarily passed through two forwarding sections such that the two forwarding sections share the forwarding processing for the packet.

Figure 3:
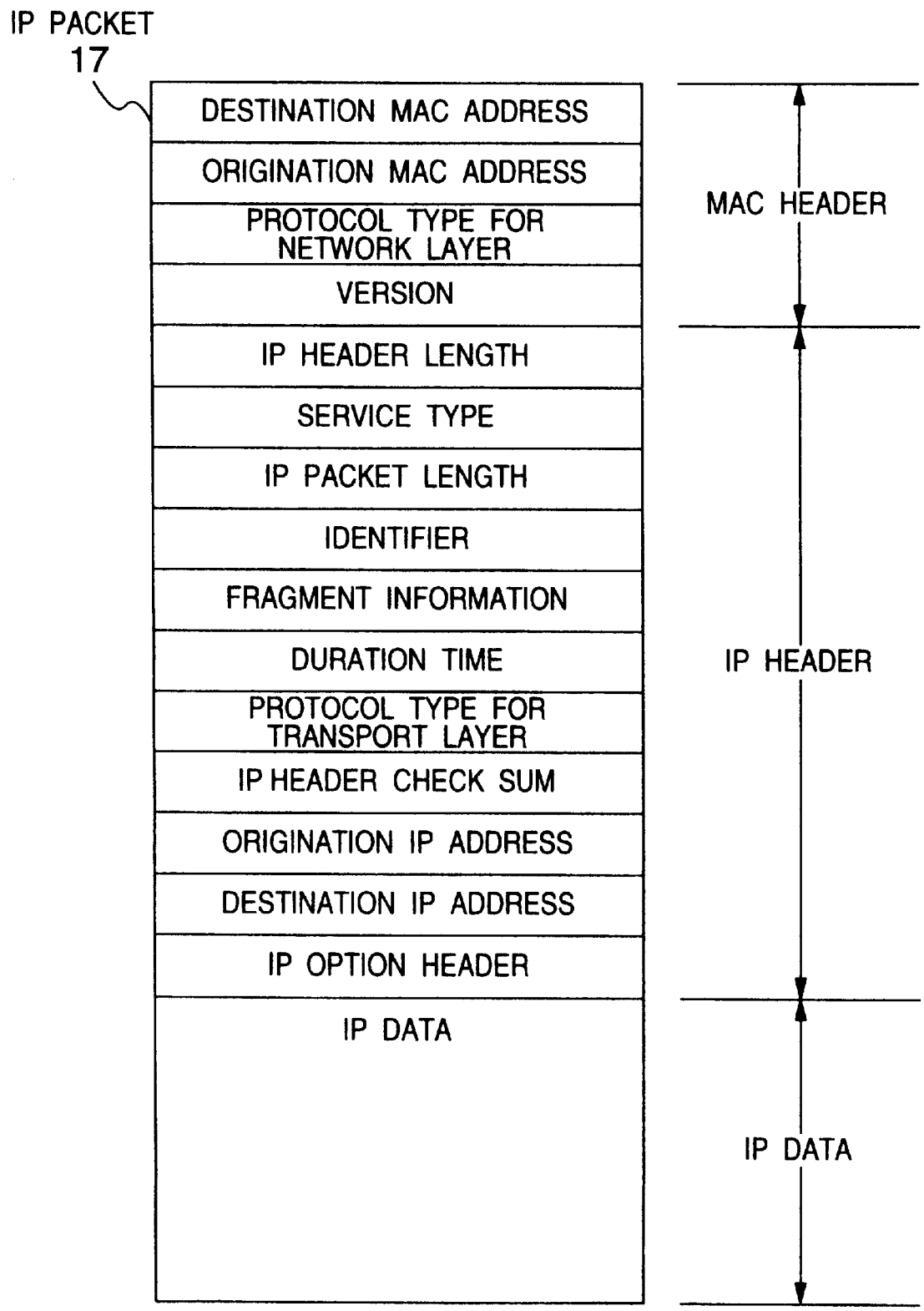
FIG. 3 illustrates an example of an IP packet.

FIG. 3 illustrates a common format for an IP (internet protocol) packet 17 communicated in the CSMA/CD networks 5–11.

Figure 4:
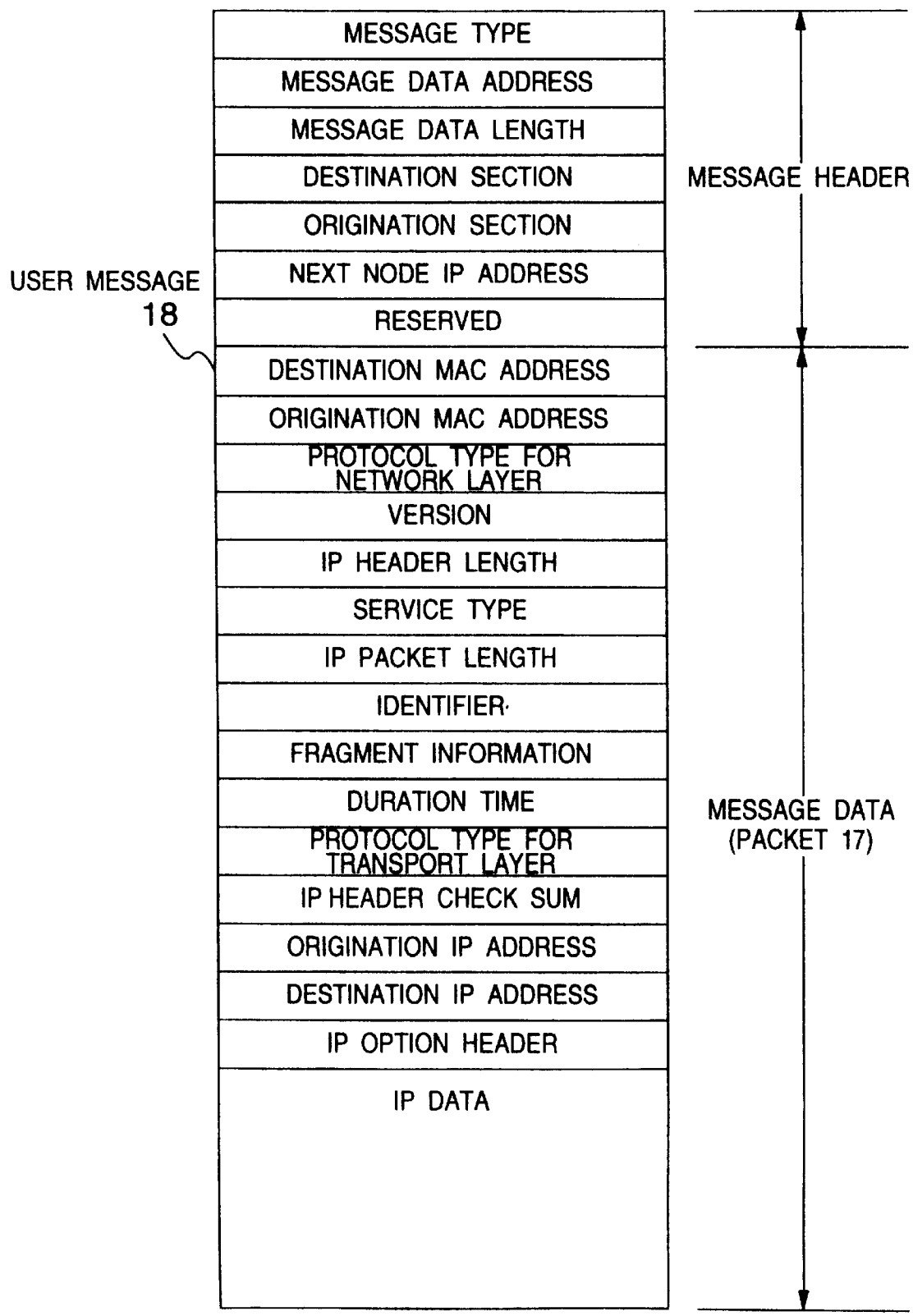
FIG. 4 illustrates a format for a user message for storing the IP packet.

FIG. 4 illustrates a format for a message 18 exchanged among the forwarding sections 21–24 through the message bus 91. Here, this message is referred to as the "user message". FIG. 4 shows a case where the packet 17 illustrated in FIG. 3 is treated as message data. A message header is composed of a message type indicative of the kind of associated message data (for example, an IP packet in the case of FIG. 4) and the input side processing performed on the data; a message data address indicative of the start address of the message data; a message data length indicative of the length of the message data; a destination section indicative of a forwarding section assigned as the destination of the user message 18; an origination section indicative of a forwarding section which has originated the message 18; and a next-IP address indicative of an IP address of a node assigned as the next destination of the packet 17. The header is given by a forwarding unit in a forwarding section which performs the input side processing.

The configuration and operation of the forwarding units 36–39 in the respective forwarding sections 21–24 will be next described with reference to FIGS. 9–11.

FIG. 10 illustrates an example of the routing tables 44–47. The router 12 exchanges routing information with adjacent routers in accordance with the setting of the user or a routing protocol (for example, RIP (Routing Information Protocol) to create and manage the routing table as illustrated.

FIG. 11 illustrates an example of the ARP tables 48–51. The router 12 exchanges address information with adjacent nodes in accordance with the setting of the user or an address resolution protocol (ARP) to create and manage the ARP table as illustrated.

The routing table and the ARP table are generally provided in an internetworking node.

Figure 9:
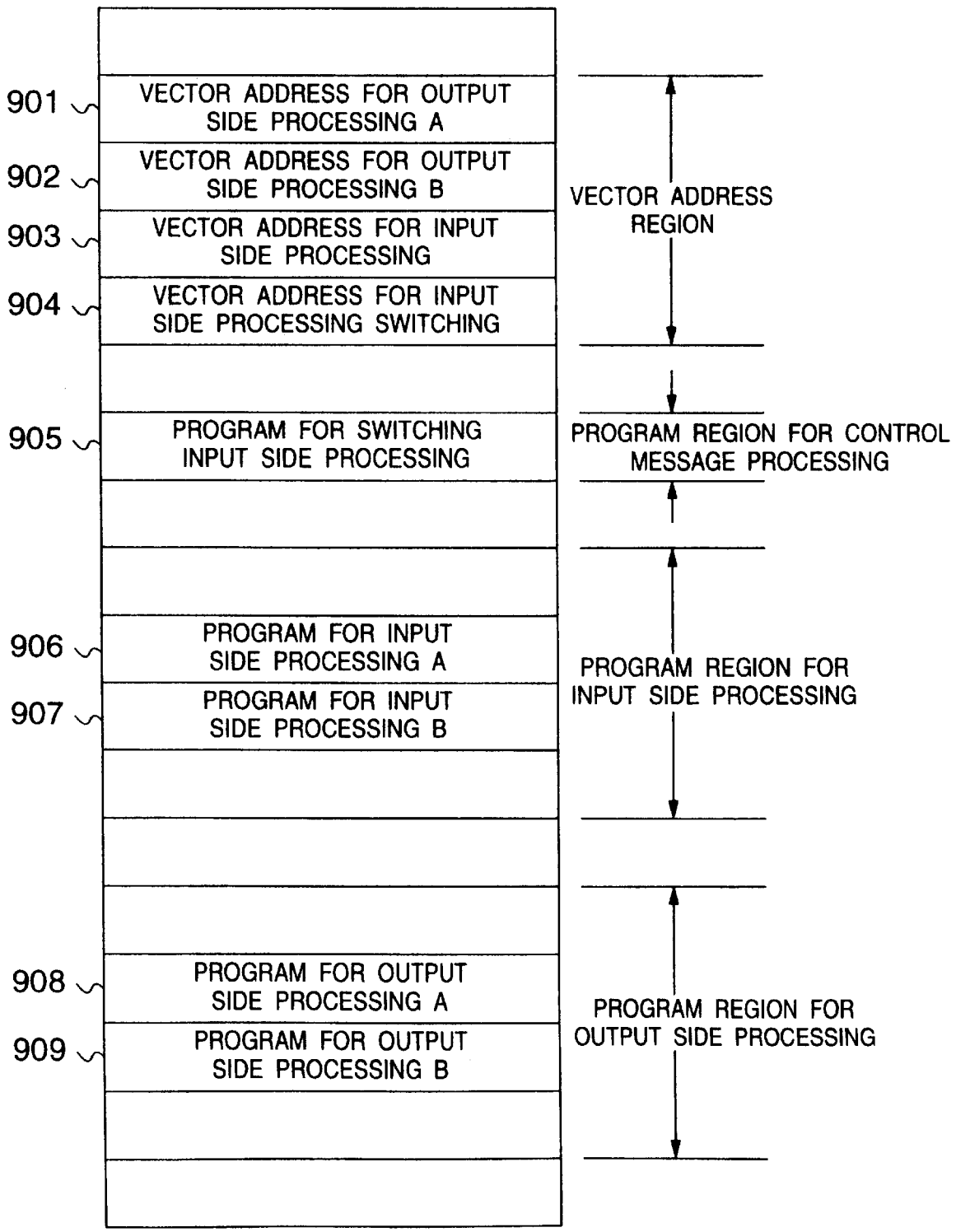
FIG. 9 illustrates the structure of a forwarding program.

Each of the forwarding programs 40–43 includes a plurality of programs which are arranged, for example, as illustrated in FIG. 9. The plurality of programs are executed by an associated processor 1–4. The forwarding programs 40–43 each include programs 906, 907 for two kinds of input side processing (A, B) and programs 908, 909 for two kinds of output side processing (A, B). Some parts of the forwarding processing (for example, division of a packet) may be performed either on the input side or on the output side. In the pair of the input side processing A and the output side processing A, the parts are executed on the output side, while, in the pair of the input side processing B and the output side processing B, the parts are executed on the input side. As mentioned above, the forwarding processing is shared by two forwarding sections relating to the forwarding processing. The adjusting section issues an instruction to allocate heavier processing to the more lightly loaded processor within the forwarding sections so as to equally distribute loads between the forwarding sections (details of this processing will be later described). The forwarding program also includes a program 905 responsive to the instruction from the adjusting section to switch the input side processing. Further, the forwarding program includes vector addresses indicative of the start addresses of the two output side processing programs 908, 909; a vector address 903 indicative of the start address of the currently executed input side processing program; and a vector address 904 indicative of the start address of the input side processing switching program 905.

The input side processing programs 906, 907, the output side processing programs 908, 909, and the input side processing switching program 905 are previously loaded from a maintenance/management terminal 93 through an external interface 92 and the message bus 91.

Next, how the router 12 receives an IP packet 17 from the network 5 and forwards the received IP packet 17 to the network 8 will be described as an example of the packet forwarding processing. Assume herein that the start address of the program for the input side processing A is set in the input side processing vector address 903.

In the forwarding section 21, the MAC controller 78 of the transceiver unit 74 receives an IP packet sent thereto from the network 5 and stores it in the data buffer 69 of the storage unit 64. Then, at the time the IP packet has been stored in the data buffer 69, the MAC controller 78 notifies the processor 1 of the reception of the IP packet. The processor 1, when receiving the IP packet from the network 5, i.e., an interrupt request, executes a program from an address which has been previously set in the input side processing vector address 903 in the forwarding program 40. The processor 1 performs the following processing on the IP packet stored in the data buffer 69 in accordance with the flow chart illustrated in FIG. 5.

Figure 5:
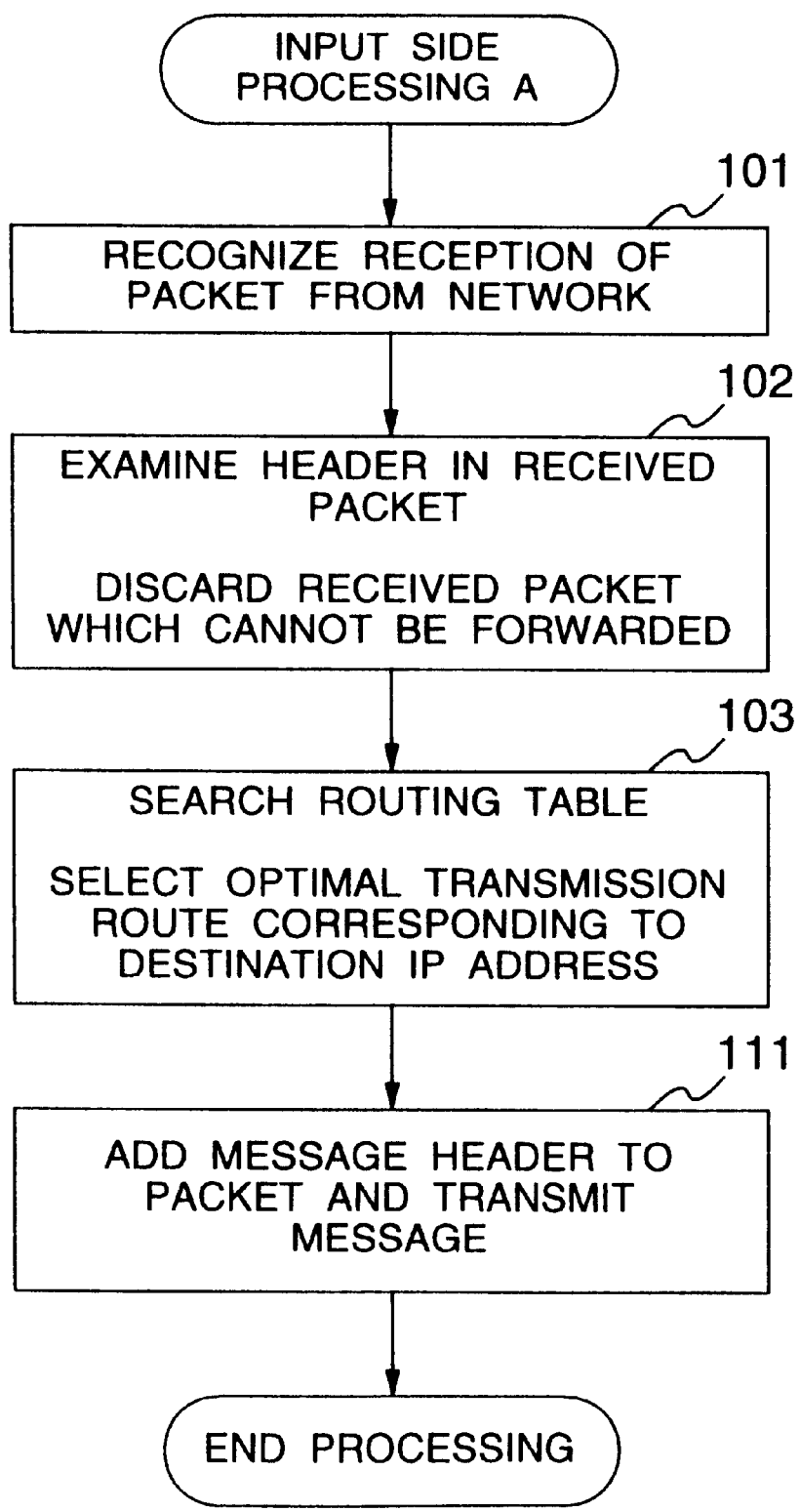
FIG. 5 is a flow chart representing the procedure of input side processing A.

In FIG. 5, first, the processor 1, when recognizing that the IP packet has been received from the network 5 (step 101), examines information contained in an MAC header and an IP header in the received packet, and discards the IP packet if the processor 1 determines that the IP packet cannot be forwarded, from the contained information which may indicate that the protocol type specified therein is not supported, the length of the IP packet is beyond an allowable range, or the like (step 102). Next, the routing table 44 (FIG. 10) is searched with a search key being the destination IP address held in the IP header in the received packet in order to select an optimal transmission route corresponding to the destination IP address (step 103). Here, a router 13 is selected as the next node, and the forwarding section 24 is selected as the forwarding section for forwarding the packet 17 to the router 13. Next, a message header for transmitting the packet to the forwarding section 24 pertinent to the route selected at step 103 is added to the packet. Then, the DMA controller 31 of the transmitter unit 26 is instructed to transmit a user message (FIG. 4) (step 111). The message header also indicates whether the addition of this header has been performed by the input processing A or B. The message type in the message header is used for this indication. The DMA controller 31 transmits the user message to the forwarding section 24 through the message bus 91 in accordance with the instruction of the processor 1.

Figure 6:
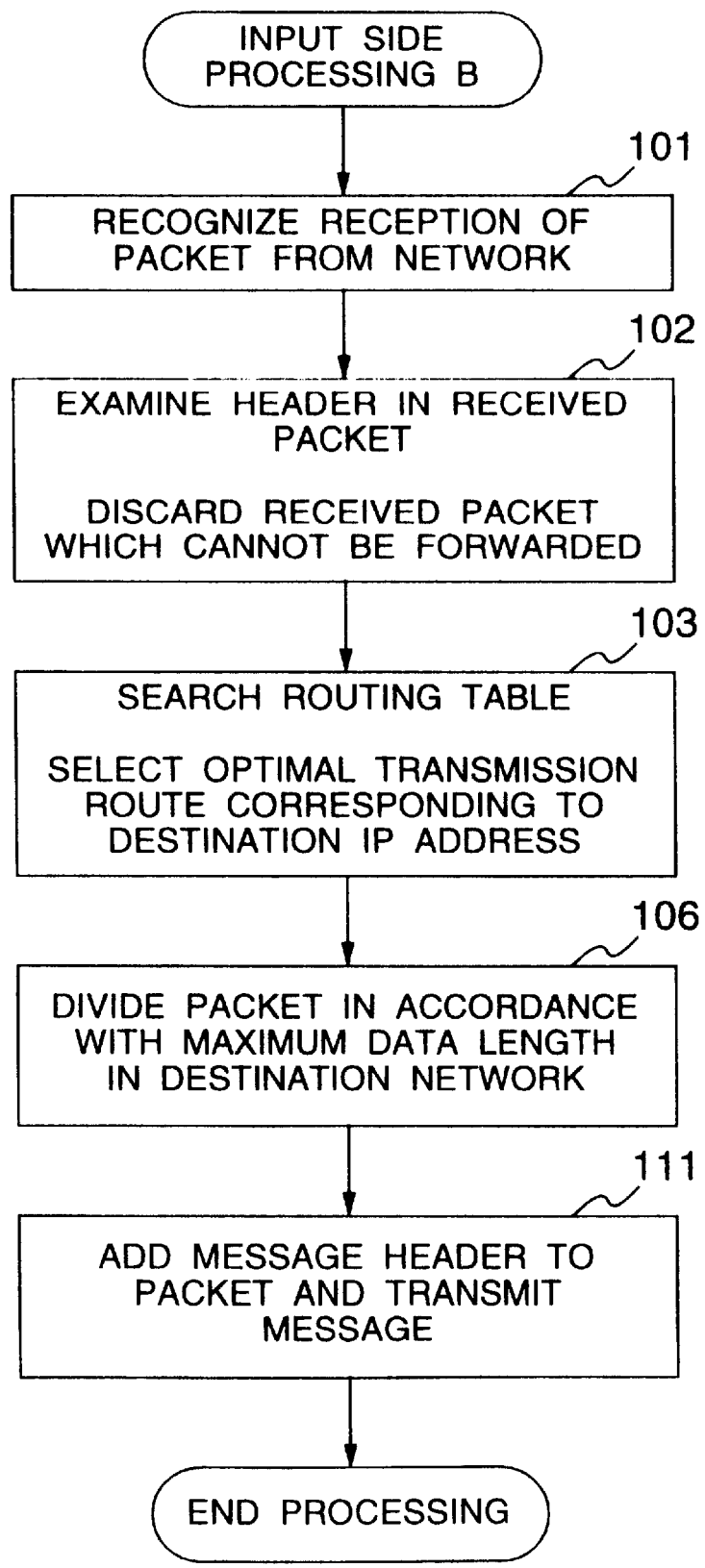
FIG. 6 is a flow chart representing the procedure of input side processing B.

When the start address of the program for the input side processing B is set in the input side processing vector address 903 in FIG. 9, the processing proceeds in accordance with a flow chart of FIG. 6 upon receiving an IP packet from a network.

FIG. 6 is substantially the same as FIG. 5 except that FIG. 6 has step 106. At step 106, a received IP packet is divided into a plurality of packets depending on a maximal data length available in a destination network of the received IP packet. The maximal data length is retrieved from the APR table. This processing, however, is a relatively large load for the processor and requires a large buffer area.

The user message sent from the forwarding section 21 to the message bus 91 is fetched into the forwarding section 24, i.e., the destination indicated in the message header.

In the forwarding section 24, the DMA controller 34 of the transmitter unit 29 receives the user message sent thereto from the message bus 91, and stores data in the received user message in the data buffer 72 of the storage unit 67. Then, at the time the received data has been stored in the data buffer 72, the DMA controller 34 notifies the processor 4 of the reception of the user message. The processor 4, when receiving the notification, examines the kind of an interrupt to recognize that the user message has been received by the forwarding section 24. Then, the processor 4 examines items in the message header to determine which of the programs A and B the input side processing has been performed. If the input side processing has been performed by the A program, the processor 4 executes the program 908 for the output side processing A indicated by a vector address 901 for an output side processing A in the forwarding program (FIG. 9).

Figure 7:
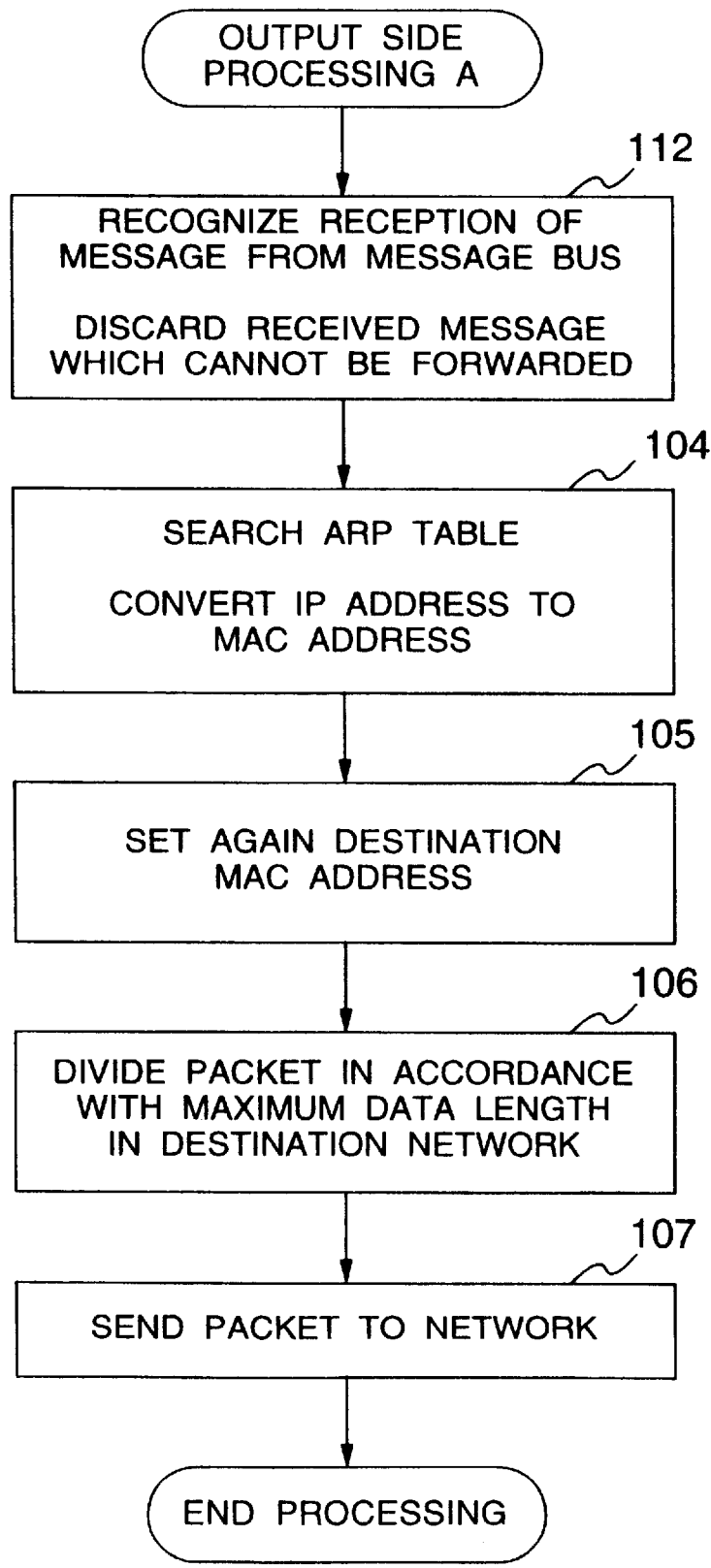
FIG. 7 is a flow chart representing the procedure of output side processing A.

The output side processing A is represented by a flow chart of FIG. 7.

First, the processor 4, when recognizing the reception of the message 18 from the message bus 91, examines information held by the message header in the received message 18, and discards the message 18 if the processor 4 determines that the message 18 cannot be forwarded (step 112). Next, the ARP table 51 (FIG. 1) is searched with a search key being a next node IP address, and the next node IP address is converted to an MAC address such that a destination MAC address is set again to the MAC address of the next node (steps 104, 105). Then, a packet 17 is divided in accordance with a maximum data length of the destination network 8 (step 106). Next, the MAC controller 81 of the transceiver unit 77 is instructed to send the packet 17 (step 107). The MAC controller 81 sends the packet to the network 8 following the instruction of the processor 4.

When the processor 4 examines the message header in the user message fetched by the forwarding section 24 and determines that the input side processing has been performed by the B program, the processor 4 executes the program 909 for the output side processing B indicated by the vector address 902 for the output side processing B in the forwarding program (FIG. 9).

Figure 8:
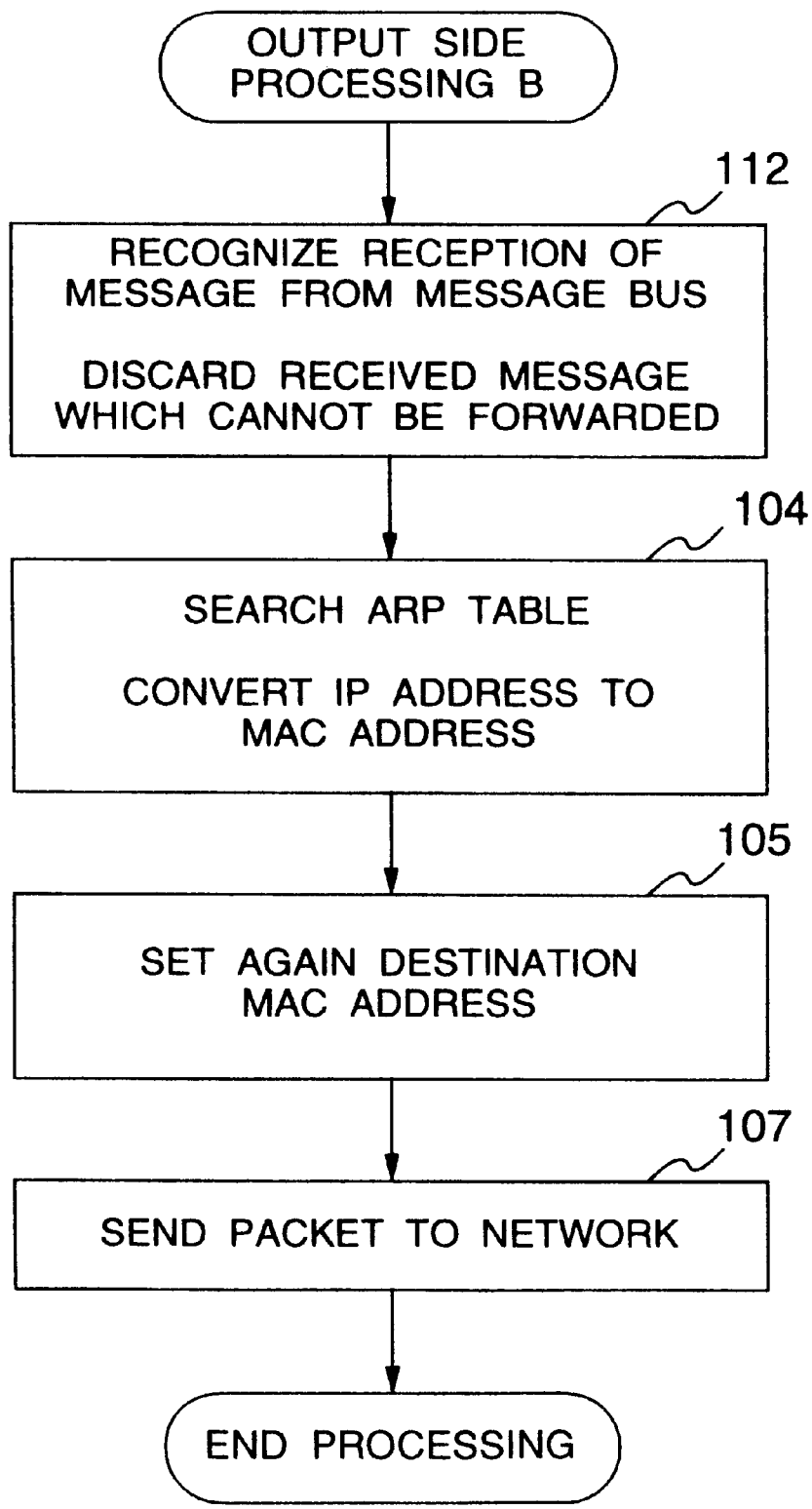
FIG. 8 is a flow chart representing the procedure of output side processing B.

The output side processing B is represented by a flow chart of FIG. 8. FIG. 8 is substantially the same as FIG. 7 only except that FIG. 8 does not have step 106. When the input side processing A and the output side processing A are performed, the packet division at step 106 is carried out in the output side processing. On the other hand, when the input side processing B and the output side processing B are performed, the packet division is carried out by the input side processing.

While the router 12 performs the forwarding processing as described above, the respective forwarding sections collect the statistics of processing time required for the forwarding processing simultaneously with the forwarding processing.

The forwarding sections 21–24 perform the following processing. First, the processors 1–4 start the timers 56–59 at the beginning of the processing at each step and stop the timers 56–59 at the end of the processing at each step, when they perform the processing at the respective steps illustrated in FIGS. 5–8. Each of the timers 56–59 measures a time period from the time it is started and to the time it is stopped by the associated processor 1–4 for each of the destination forwarding sections 21–24 when the input side processing is concerned and for each of the origination forwarding sections 21–24 when the output side processing is concerned. Then, the processors 1–4 create statistics tables 60–63 listing the processing time statistics of user packets 17 which are forwarded by the processors 1–4 in a unit time. FIG. 12 shows an example of statistics data created in the input side processing, and FIG. 13 shows an example of statistics data created in the output side processing.

Figure 14:
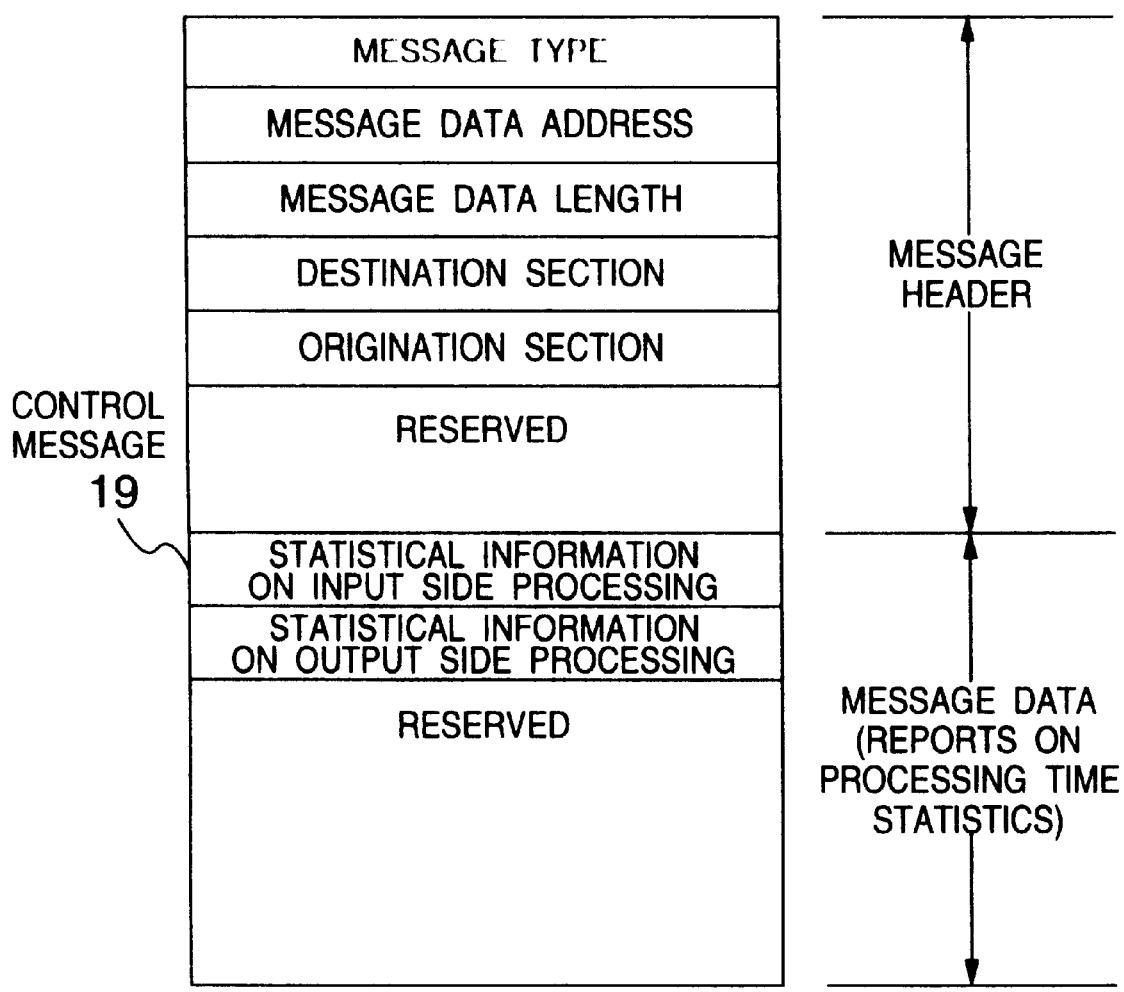
FIG. 14 illustrates a format for a control message for storing the processing time statistics of processors.

Each processor copies the processing time statistics on the statistics table to a data buffer when the unit time (for example, 30 seconds) has passed, and adds a message header as illustrated in FIG. 14 to the statistics to create a message 19. This message is referred to as the "control message" for distinguishing it from the user message. Each processor instructs the associated DMA controller 31–34 to transmit the control message for reporting the processing time statistics to the adjusting section 25, whereby the control message is sent to the adjusting section 25 through the message bus 91.

In the adjusting section 25, the following processing is performed. First, the DMA controller 35 receives a processing time statistics control message 19 from the message bus 91 and stores the control message 19 in the data buffer 73. At the time the control message 19 has been stored in the data buffer 73, the DMA controller 35 notifies the processor 83 of the reception of the control message 19. The processor 83, when receiving the control message 19, i.e., an interrupt request from the message bus 91, performs the following processing on the control message 19 stored in the data buffer 73. First, the processor 83 selects a program which balances processing loads on the respective processors 1–4, for example, utilization ratios of the processors expressed by Equation 1 from programs for sharing different amounts of input side processing and output side processing, previously loaded in the forwarding programs 40–43, based on the processing time statistics of the respective processors 1–4 (FIGS. 12, 13):

Utilization Ratio of Processor i $$\text{Utilization Ratio of Processor } i = \frac{\sum_{j=1}^{4}\sum_{k=1}^{9} u(i,j,k) + \sum_{j=1}^{4}\sum_{k=1}^{9} d(i,j,k)}{\text{Unit Time}} \quad \text{Equation 1}$$

Figure 16:
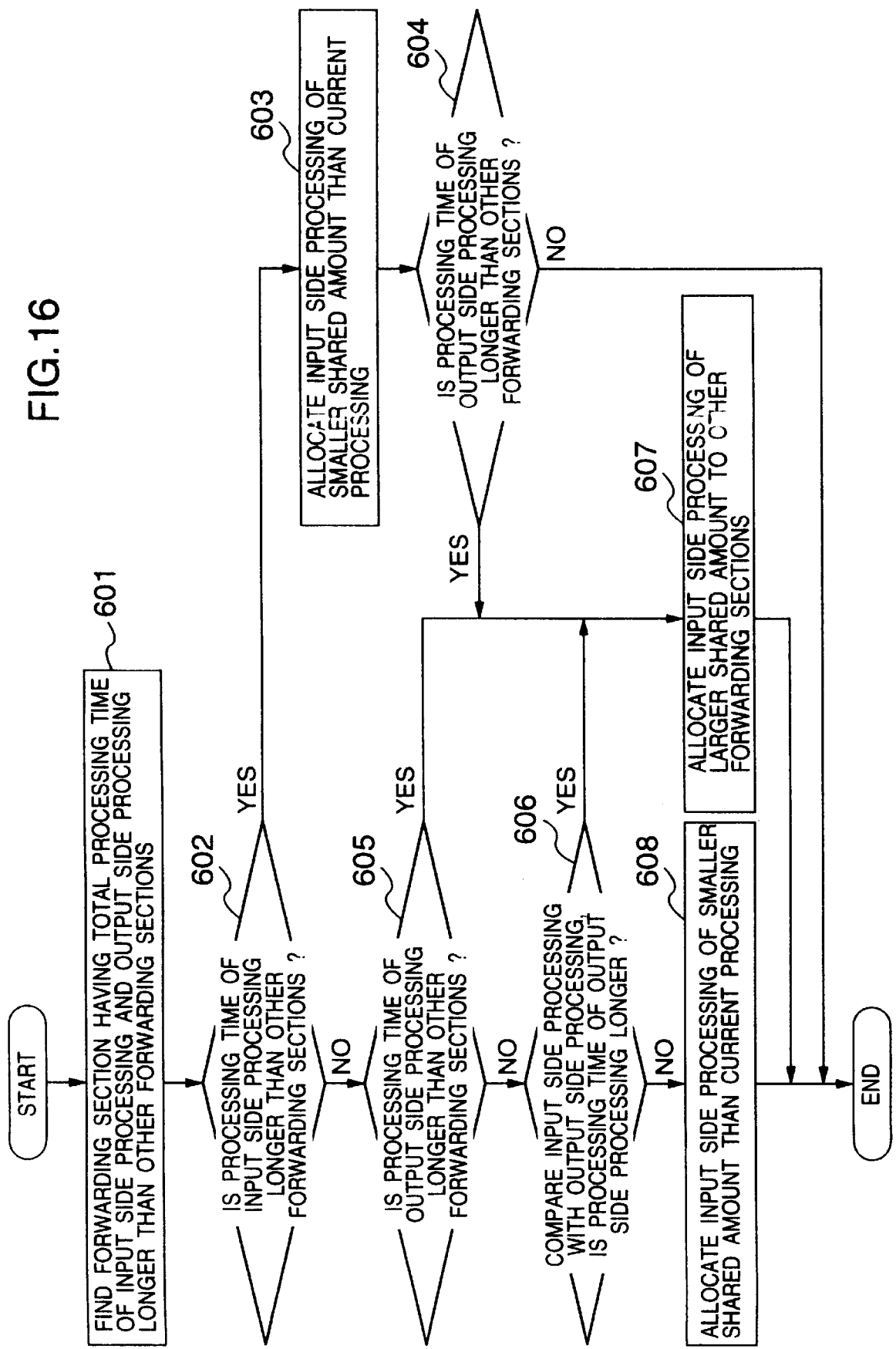
FIG. 16 is a flow chart representing a procedure for modifying processing allocation executed by an adjusting unit.

$u$: Input side processing time statistics $d$: Output side processing time statistics $i$: Processor number $j$: Destination forwarding section number or Origination forwarding section number $k$: Step number of program FIG. 16 is a flow chart for selecting a program, executed by the adjusting section 25. First, the adjusting section 25 adds a processing time of the input side processing and a processing time of the output side processing in the processing time statistics sent from each forwarding section, and finds the forwarding section having the longest processing time among all the forwarding sections (step 601). Next, it is determined whether the forwarding section having the longest processing time has a heavier burden in the input side processing or in the output side processing by comparing respectively input side processing times or output side processing times of the other forwarding sections (steps 602, 605, 604).

If the forwarding section having the longest processing time has a heavier burden in the input side processing compared with the other forwarding sections, the input side processing of the forwarding section is switched to other processing of lighter burden (step 603). In this example, the program for the input side processing A is allocated to the forwarding section having the longest processing time. If the forwarding section having the longest processing time has a heavier burden in the output side processing compared with the other forwarding sections, all of the other forwarding sections are allocated the input side processing of heavier burden (step 607). In this case, the input side processing B is allocated.

If the forwarding section having the longest processing time, although heavily loaded, does not have a particularly long input side processing time or output side processing time compared with other forwarding sections, the input side processing time is compared with the output side processing time within the forwarding section itself (step 606). If the input side processing time is longer, the processing of lighter burden is allocated to the input side processing of the forwarding section (step 608). Conversely, if the output side processing time is longer, all the other forwarding sections are allocated the input side processing of heavier burden (step 607).

Figure 15:
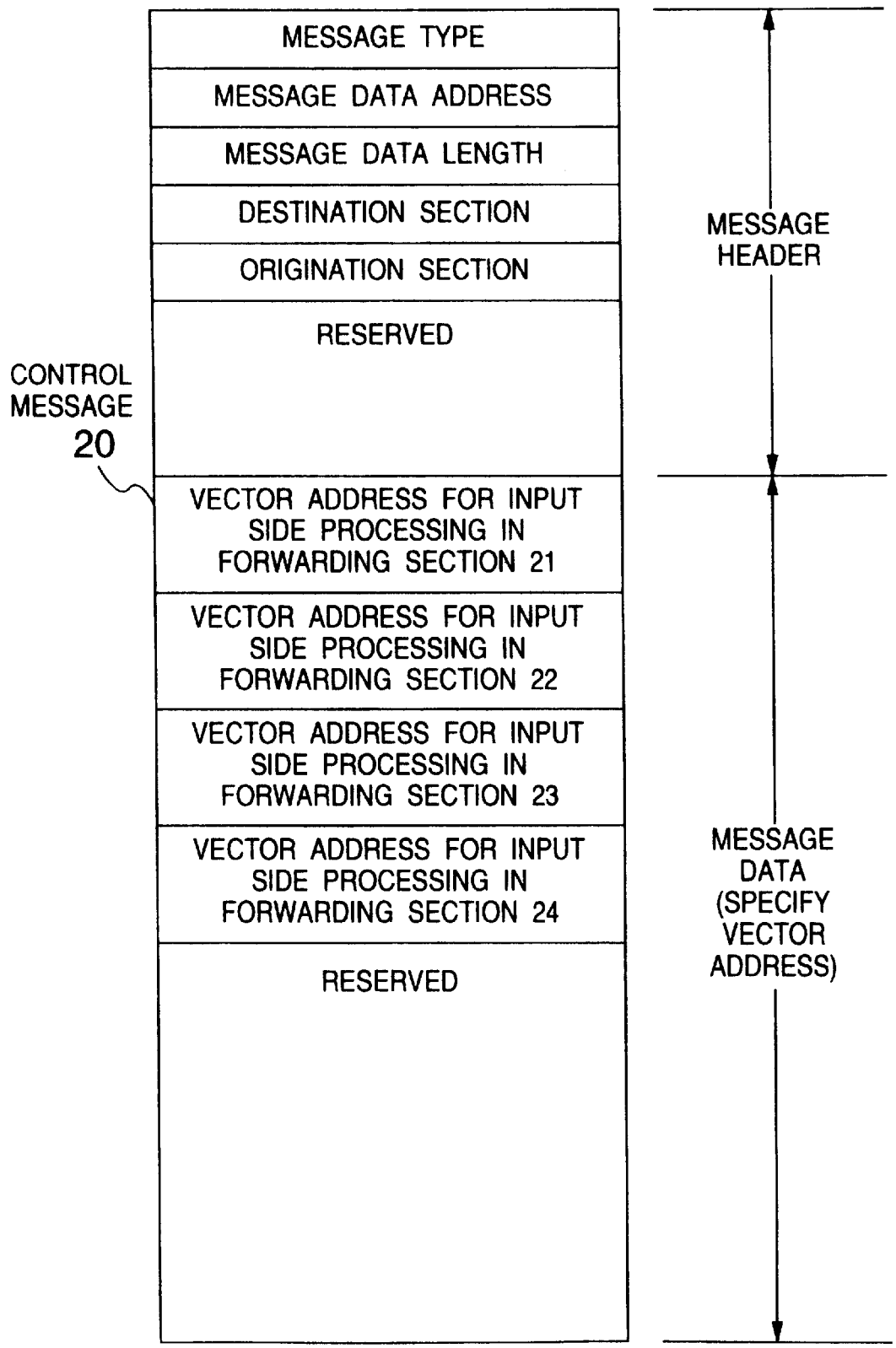
FIG. 15 illustrates a format for a control message for storing vector addresses for the input side processing performed by respective forwarding units.

Next, the processor 83 of the adjusting section 25 creates a message for instructing the respective processors 1–4 to execute the selected program, and instructs the DMA controller 35 to transmit the message to the forwarding sections 21–24. The format of the message created in this event is illustrated in FIG. 15. This message 20 is referred to as the "control message" for specifying a vector address. Since the message 20 instructs the respective forwarding sections to execute either the input side processing program A or the input side processing program B, the message 20 has an input side processing vector address for each forwarding section. The vector address field corresponding to a forwarding section, which is not required of the switching of the input side processing, may be filled with, for example, 'xFFFFFFFF' or the like. The DMA controller 35, following the instruction of the processor 83, transmits the control message to the forwarding sections 21–24 through the message bus 91.

Each of the forwarding sections 21–24, upon receiving the vector address specifying control message 20, performs the following processing for switching the input side processing. This processing corresponds to the input side processing switching program (905) which begins at the input side processing switching vector address (904) in FIG. 9.

First, the DMA controller in each forwarding section receives the control message sent thereto from the message bus 91 and stores the received control message in the data buffer. Then, at the time the control message has been stored in the data buffer, the DMA controller notifies the processor of the reception of the control message. When the processor receives the control message, i.e., an interrupt request from the message bus 91, and recognizes that the control message has been transmitted thereto through the message bus 91, the processor rewrites the input side processing vector address (FIG. 9, 903) in the forwarding program to a value specified in the received message.

As described above, each forwarding section, when receiving a user packet from a network, performs the input side processing with a program indicated by the input side processing vector address 903. In addition, a forwarding section, which also performs the output side processing, performs the output side processing corresponding to the input side processing for each user message. Thus, the processing can be switched.

In the foregoing embodiment, one and the same message bus 91 is used as a route for transmitting a user message between forwarding sections and as a route for transmitting a control message between a forwarding section and the adjusting section. However, alternatively the route for transmitting a user message between forwarding sections and the route for transmitting a control message between a forwarding section and the adjusting section may be separately provided.

Also, while the foregoing embodiment has been described in connection with a router having four forwarding sections, the router may be similarly implemented with the number of forwarding sections being larger than or smaller than four.

Further, the foregoing embodiment has been described using CSMA/CD networks as networks constituting the communication network system. However, alternatively, networks amenable to another scheme, for example, token ring networks may be similarly used.

Furthermore, the foregoing embodiment has been described using the Internet Protocol as a protocol for the network layer. However, alternatively, another protocol, for example, IPX (Internetworking Packet exchange) may be similarly used.

Additionally, the foregoing embodiment has been described in connection of a router which is used as an internetworking node. However, alternatively, it may be another internetworking node, for example, a bridge or a bridging router.

In the foregoing embodiment, processing times are measured to determine loads on the respective forwarding sections. Alternatively, buffer utilization ratios of the data buffer 69–72 in the respective forwarding sections may be measured.

The utilization ratios of the data buffers change in response to loads processed by the respective processors 1–4. Specifically, as each processor has a larger processing load, a packet 17 will stay for a longer time in the data buffer, thus increasing the utilization ratio of the data buffer. Conversely, as each processor has a smaller processing load, a packet will stay for a shorter time in the data buffer, thus reducing the utilization ratio of the data buffer. Here, the utilization ratio of the data buffer refers to the utilization ratio of each of the data buffers allocated to each of the MAC controllers 78–81 in order to receive packets sent thereto from the networks 5–8 and the utilization ratio of each of the data buffers allocated to each of the DMA controllers 31–34 for receiving messages sent thereto from the message bus 91.

Although messages sent from the message bus 91 include user messages and control messages, the control messages may be ignored if the quantity is concerned. Thus, the utilization ratio of the data buffer for the MAC controller may be used instead of the input side processing time, and the utilization ratio of the data buffer for the DMA controller may be used instead of the output side processing time.

In this example, the employment of the buffer utilization ratios may eliminate the statistics units 52–55 in the router 12 illustrated in FIG. 11.

Further, the numbers of servers connected to the networks corresponding to the respective forwarding sections may be used for predicting loads on the respective forwarding sections.

In a client server system, a client requests a service to a server, and the server, responsive to the request, provides the service to the client. Since the request and provision of the service is realized by a packet communicated between the client and the server, the traffic of packets concentrates on a server which provides services to a large number of clients. Thus, a network is burdened with a larger load as a number of servers connected thereto is larger, and the processing loads on the processors 1–4 in the router 12, which process the traffic of packets, becomes heavier.

In this example, a counter unit including a timer for measuring time and a counter for counting the number of servers is provided instead of the statistics unit 52–55 in each forwarding section of the router 12 illustrated in FIG. 1.

The processor in each forwarding section periodically broadcasts a server detection request packet to the networks, such that the counter of the counter unit counts the number of servers which have responded to the server detection request packet. Then, each forwarding section transmits the number of counted servers to the adjusting section as a control message.

The adjusting section allocates input side processing programs to the respective forwarding sections so as to alleviate the input side processing and the output side processing of a forwarding section with which a large number of servers are associated.

In this example, the processor in each forwarding section periodically transmits the server detection request packet for polling. Alternatively, the servers may be instructed to actively and periodically transmit packets of a predetermined format such that the respective forwarding sections can count the packets to recognize the number of associated servers.

In the examples so far described, the adjusting section automatically balances loads among the forwarding sections. Alternatively, the maintenance/management terminal 93 may balance the loads on the respective forwarding sections in response to instructions from the operator. In this case, the maintenance/management terminal 93 receives and displays reports on loads from the forwarding sections, accepts instructions from the operator, creates a control message (FIG. 15) for specifying a vector address in response to the instructions, and transmits the control message for specifying a vector address (FIG. 15) to all the forwarding sections.

What is claimed is:

1. An internetworking apparatus, comprising:
   a plurality of forwarding means each connected to one of a plurality of different networks for sharing packet forwarding processing, wherein a packet is forwarded by said plurality of forwarding means among said plurality of networks;
   adjusting means; and
   connecting means for interconnecting said plurality of forwarding means and said adjusting means;
   wherein each of said forwarding means includes means for measuring a processing load thereon to report a measuring result to said adjusting means,
   wherein said adjusting means, responsive to said measuring result, sends to each of input and output side forwarding means an instruction to change allocation of packet forwarding processing between said input and output side forwarding means to balance processing loads on said input and output side forwarding means.

2. An internetworking apparatus according to claim 1, wherein each of said plurality of forwarding means can selectively execute any one of a plurality of input side processings which are allocated different portions of said packet forwarding processing, and any one of a plurality of output side processings, which are provided in correspondence to said plurality of input side processing, and which are allocated different portions of said packet forwarding processing;
   said measuring means collects to statistics of processing times required by each of said plurality of forwarding means; and
   said adjusting means, responsive to measuring results of said measuring means, allocates one or both of input side processings having a smaller shared amount and output side processings having a smaller shared amount to one of said plurality of forwarding means having a longer processing time than the remainder of said plurality of forwarding means and allocates processing corresponding to said allocated processing to the remainder of said plurality of forwarding means.

3. An internetworking apparatus according to claim 1, wherein each of said plurality of forwarding means includes storage means for storing packet data used to perform the packet forwarding processing;
   each of said plurality of forwarding means is capable of executing a plurality of input side processings which are allocated different portions of said packet forwarding processing, and a plurality of output side processings provided in correspondence to said plurality of input side processings;
   said measuring means measures amounts of data processed by said forwarding means from data stored in said storage means; and
   said adjusting means, responsive to the measuring results of said measuring means, allocates one or both of input side processing having a smaller shared amount and output side processing having a smaller shared amount to one of said plurality of forwarding means having a larger amount of data to be processed than the remainder of said plurality of forwarding means and allocates processing corresponding to said allocated processing to the remainder of said plurality of forwarding means.

4. An internetworking apparatus according to claim 1, wherein:
   said forwarding means can selectively execute any one of a plurality of input side processings which are allocated different portions of said packet forwarding processing, and a plurality of output side processings provided in correspondence to said plurality of input side processings;
   said measuring means detects servers connected to each of networks associated with said forwarding means and counts the number of servers connected to each of said plurality of;
   said adjusting means, responsive to the measuring results of said measuring means, allocates one or both of input side processings having a smaller shared amount and output side processings having a smaller shared amount to one of said plurality of forwarding means having a larger number of servers connected thereto than the remainder of said plurality of forwarding means and allocates processing corresponding to said allocated processing to the remainder of said plurality of forwarding means.

5. An internetworking apparatus according to claim 1, wherein:
   said forwarding means can selectively execute any one of a plurality of input side processings which are allocated different portions of said packet forwarding processing, and any one of a plurality of output side processings, which are provided in correspondence to said plurality of input side processings, and which are allocated different portions of said packet forwarding processing;
   said measuring means collects the statistics of processing time required by each of said plurality of forwarding means; and
   said adjusting means, responsive to the measuring results, allocates input side processings having a smaller shared amount to one of said plurality of forwarding means having a longer processing time than the remainder of said plurality of forwarding means, and/or allocates input side processings having a larger shared amount to the remainder of said plurality of forwarding means, each of said plurality of forwarding means performing output side processings corresponding to said allocated input side processings.

6. An internetworking apparatus, comprising:

a plurality of forwarding means each connected to one of a plurality of different networks for sharing packet forwarding processing, wherein a packet is forwarded by said plurality of forwarding means among said plurality of networks;

a terminal; and connecting means for interconnecting said plurality of forwarding means and said terminal;

wherein each of said forwarding means includes means for measuring a processing load thereon to report a measuring result to said terminal, wherein said terminal displays the measuring result of said measuring means, accepts an operation of on operator performed in response to said display, and sends each of input and output side forwarding means an instruction to change allocation of packet forwarding processing between said input and output side forwarding means in response to the operation of the operator.

7. In an internetworking apparatus having a plurality of forwarding means each connected to one of a plurality of different networks and means for interconnecting each of said plurality of forwarding means, wherein each of said forwarding means share packet data forwarding processing, wherein a packet is forwarded by said plurality of forwarding means among said plurality of networks, a method of balancing loads on said plurality of forwarding means comprises the steps of:

preparing a plurality of programs each allocating different amounts of input side processings and output side processings to be executed by said forwarding means;

providing adjusting means which are interconnected with all of said plurality of forwarding means;

each of said forwarding means measuring a load thereon and reporting the measured load to said adjusting means; and said adjusting means determining a program to be executed by each of input and output side forwarding means, based on the reports from said respective forwarding means, to balance loads on all of said input and output side forwarding means, and issuing an instruction to each of said input and output side forwarding means.

8. A computer program stored in a storage medium readable by adjusting means of an internetworking apparatus, said internetworking apparatus comprising:

a plurality of forwarding means separately disposed corresponding to each of a plurality of networks connected thereto for sharing packet forwarding processing, the packet being transmitted among said plurality of networks;

said adjusting means; and connecting means for interconnecting said plurality of forwarding means and said adjusting means, said computer programs, by the adjusting means, balances loads on said plurality of forwarding means by receiving a report on a load from each of said forwarding means, comparing the loads on all of said forwarding means to allocate processing of a smaller burden to the forwarding means having a load heavier than the remaining forwarding means and/or to allocate processing of a larger burden to the remaining forwarding means, and notifying all of said forwarding means of said allocation.

9. An internetworking apparatus, comprising:

a plurality of forwarding means each connected to one of a plurality of different networks for sharing packet forwarding processing, wherein a packet is forwarded by said plurality of forwarding means among said plurality of networks;

adjusting means; and connecting means for interconnecting said plurality of forwarding means and said adjusting means;

wherein each of said forwarding means includes means for measuring a processing load thereon to report a measuring result to said adjusting means, wherein said adjusting means, responsive to a measuring result from one of said plurality of forwarding means, sends to one forwarding means an instruction to change allocation of packet forwarding processing between said one forwarding means and another of said plurality of forwarding means to balance processing loads on said one and another forwarding means.

10. An internetworking apparatus according to claim 9, wherein each of said plurality of forwarding means can selectively execute any one of a plurality of processings which are executed by said one forwarding means and are allocated different portions of said packet forwarding processing, and a plurality of processings which are executed by said another forwarding means and are provided in correspondence to said plurality processings executed by said one forwarding means, and which are allocated different portions of said packet forwarding processing;

said measuring means collects to statistics of processing times required by each of said plurality of forwarding means; and said adjusting means, responsive to measuring results of said measuring means, allocates one or both of processings executed by said one forwarding means having a smaller shared amount and processings executed by said another forwarding means having a smaller shared amount to one of said forwarding means having a longer processing time than the remainder of said plurality of forwarding means and allocates processing corresponding to said allocated processing to the remainder of said plurality of forwarding means.

11. An internetworking apparatus according to claim 9, wherein each of said plurality of forwarding means includes storage means for storing packet data used to perform the packet forwarding processing;

each of said plurality of forwarding means is capable of executing a plurality of input side processings which are allocated different portions of said packet forwarding processing, and a plurality of output side processings provided in correspondence to said plurality of input side processings;

said measuring means measures amounts of data processed by said forwarding means from data stored in said storage means; and said adjusting means, responsive to the measuring results of said measuring means, allocates one or both of input side processing having a smaller shared amount and output side processing having a smaller shared amount to one of said plurality of forwarding means having a larger amount of data to be processed than the remainder of said plurality of forwarding means and allocates processing corresponding to said allocated processing to the remainder of said plurality of forwarding means.

12. An internetworking apparatus according to claim 9, wherein:

said forwarding means can selectively execute any one of a plurality of input side processings which are allocated different portions of said packet forwarding processing, and a plurality of output side processings provided in correspondence to said plurality of input side processings;

said measuring means detects servers connected to each of networks associated with said forwarding means and counts the number of servers connected to each of said plurality of;

said adjusting means, responsive to the measuring results of said measuring means, allocates one or both of input side processings having a smaller shared amount and output side processings having a smaller shared amount to one of said plurality of forwarding means having a larger number of servers connected thereto than the remainder of said plurality of forwarding means and allocates processing corresponding to said allocated processing to the remainder of said plurality of forwarding means.

13. An internetworking apparatus according to claim 9, wherein:

said forwarding means can selectively execute any one of a plurality of input side processings which are allocated different portions of said packet forwarding processing, and any one of a plurality of output side processings, which are provided in correspondence to said plurality of input side processings, and which are allocated different portions of said packet forwarding processing;

said measuring means collects the statistics of processing time required by each of said plurality of forwarding means; and said adjusting means, responsive to the measuring results, allocates input side processings having a smaller shared amount to one of said plurality of forwarding means having a longer processing time than the remainder of said plurality of forwarding means, and/or allocates input side processings having a larger shared amount to the remainder of said plurality of forwarding means, each of said plurality of forwarding means performing output side processings corresponding to said allocated input side processings.

14. An internetworking apparatus, comprising:

a plurality of forwarding means each connected to one of a plurality of different networks for sharing packet forwarding processing, wherein a packet is forwarded by said plurality of forwarding means among said plurality of networks;

a terminal; and connecting means for interconnecting said plurality of forwarding means and said terminal;

wherein each of said forwarding means includes means for measuring a processing load thereon to report a measuring result to said terminal, wherein said terminal displays the measuring result of said measuring means, accepts an operation of an operator performed in response to said display, and sends each of said forwarding means an instruction to change allocation of processing among each of said plurality of forwarding means in response to the operation of the operator.

15. In an internetworking apparatus having a plurality of forwarding means each connected to one of a plurality of different networks and means for interconnecting each of said plurality of forwarding means, wherein each of said forwarding means share packet data forwarding processing, the packet is forwarded by said plurality of forwarding means among said plurality of networks, a method of balancing loads on said plurality of forwarding means comprises the steps of:

preparing a plurality of programs each allocating different amounts of processings to be executed among said forwarding means;

providing adjusting means which are interconnected with all of said plurality of forwarding means;

each of said forwarding means measuring a load thereon and reporting the measured load to said adjusting means; and said adjusting means determining a program to be executed by each of said forwarding means, based on the reports from said respective forwarding means, so as to balance the loads on all of said plurality of forwarding means, and issuing an instruction to each of said plurality of forwarding means.

* * * * *